US007891697B1

(12) United States Patent
Fahrbach

(10) Patent No.: US 7,891,697 B1
(45) Date of Patent: Feb. 22, 2011

(54) TRAILER HAVING A FOLDING AND LOAD BEARING PLATFORM

(76) Inventor: John G. Fahrbach, 4095 Williston Rd., Northwood, OH (US) 43619

( * ) Notice: Subject to any disclaimer, the term of this patent is extended or adjusted under 35 U.S.C. 154(b) by 183 days.

(21) Appl. No.: 12/150,718

(22) Filed: Apr. 30, 2008

Related U.S. Application Data

(60) Provisional application No. 60/926,728, filed on Apr. 30, 2007.

(51) Int. Cl.
B62B 1/00 (2006.01)
(52) U.S. Cl. .................................. 280/656; 280/789
(58) Field of Classification Search .................. 280/30, 280/32.7, 35, 38, 43, 204, 415.1, 489, 491, 280/492, 638, 639, 655, 656, 762, 769, 789; 224/519, 520, 521; 301/127
See application file for complete search history.

(56) References Cited

U.S. PATENT DOCUMENTS

| 1,226,867 | A | * | 5/1917 | Dempsey | 301/127 |
|---|---|---|---|---|---|
| 2,555,954 | A | * | 6/1951 | Brufiat | 33/264 |
| 2,558,311 | A | * | 6/1951 | Morrow | 267/275 |
| 2,628,126 | A | * | 2/1953 | Black | 298/5 |
| 2,720,413 | A | * | 10/1955 | Halverson | 296/10 |
| 4,175,768 | A | * | 11/1979 | Thackray | 280/652 |
| 4,239,258 | A | * | 12/1980 | Burris | 280/639 |
| 4,362,316 | A | * | 12/1982 | Wright | 280/656 |
| 4,463,826 | A | * | 8/1984 | Pearce | 182/20 |
| 4,494,797 | A | * | 1/1985 | Carberry | 298/5 |
| 4,511,181 | A | * | 4/1985 | Schantz | 298/5 |
| 4,526,399 | A | * | 7/1985 | Holtz | 280/655 |

(Continued)

FOREIGN PATENT DOCUMENTS

GB          2010191 A  *  6/1979

(Continued)

OTHER PUBLICATIONS

Photograph, www.atvconnection.com/atvconnection/images/59784702.jpg; Dec. 11, 2005.

(Continued)

Primary Examiner—J. Allen Shriver, II
Assistant Examiner—Brodie Follman
(74) Attorney, Agent, or Firm—MacMillan, Sobanski & Todd, LLC

(57) ABSTRACT

A folding trailer suitable for being towed behind a vehicle includes a platform having a center section, a forward section, and a rearward section. A first hinge element engages the center section and the forward section and has a first rotational centerline that is above the center section. The first hinge element enables the forward section to be folded relative to the center section. A second hinge element engages the center section and the rearward section and has a second rotational centerline. The second rotational centerline is longitudinally spaced apart from the first rotational centerline and above the center section. The second rotational centerline is vertically offset from the first rotational centerline and enables the rearward section to be folded relative to the center section. The rearward section engages the second hinge element for rotation about the second rotational centerline relative to the center section. When the trailer is in a folded position, the rearward section is positioned between the center section and the forward section.

13 Claims, 5 Drawing Sheets

U.S. PATENT DOCUMENTS

| | | | | |
|---|---|---|---|---|
| 4,637,626 | A * | 1/1987 | Foss et al. | 280/655 |
| 4,746,142 | A * | 5/1988 | Davis | 280/656 |
| 4,765,643 | A | 8/1988 | Pappanikolaou | |
| 4,786,073 | A | 11/1988 | Harper | |
| 4,813,841 | A * | 3/1989 | Eischen | 414/477 |
| 4,957,306 | A * | 9/1990 | Greenberg | 280/652 |
| 5,320,376 | A | 6/1994 | Bojarski et al. | |
| 5,411,287 | A * | 5/1995 | Henschen | 280/124.169 |
| 5,540,538 | A * | 7/1996 | Head, Sr. | 414/485 |
| 5,544,944 | A | 8/1996 | Keech | |
| 5,645,292 | A | 7/1997 | McWilliams et al. | |
| 5,673,928 | A | 10/1997 | Jury | |
| 5,775,868 | A * | 7/1998 | Mann | 414/475 |
| 5,941,542 | A * | 8/1999 | Kalman | 280/38 |
| 6,254,117 | B1 | 7/2001 | Cross | |
| 6,308,968 | B1 | 10/2001 | Hollingsworth | |
| 6,375,200 | B1 * | 4/2002 | Harter | 280/30 |
| 6,447,237 | B1 * | 9/2002 | Haynes | 414/483 |
| 6,511,092 | B1 | 1/2003 | Chepa | |
| 6,561,529 | B2 | 5/2003 | Darling | |
| 6,688,634 | B2 * | 2/2004 | Noffsinger | 280/651 |
| 6,688,635 | B1 | 2/2004 | Watts | |
| 6,805,269 | B2 * | 10/2004 | Lockard | 224/153 |
| 6,834,882 | B1 * | 12/2004 | Boyd | 280/656 |
| 6,846,003 | B2 * | 1/2005 | Thompson | 280/656 |
| 6,926,292 | B1 * | 8/2005 | Weeks | 280/47.331 |
| 6,942,228 | B2 | 9/2005 | Bunce et al. | |
| 6,991,250 | B2 * | 1/2006 | Lindsey et al. | 280/651 |
| 7,055,848 | B1 * | 6/2006 | James | 280/656 |
| 7,150,466 | B1 * | 12/2006 | Chapman et al. | 280/656 |
| 7,175,205 | B2 * | 2/2007 | Simpson | 280/789 |
| 7,360,783 | B2 * | 4/2008 | Home | 280/639 |
| 7,458,597 | B2 * | 12/2008 | MacDougall | 280/491.1 |
| 7,540,528 | B2 * | 6/2009 | Spainhower | 280/656 |
| 7,543,842 | B1 * | 6/2009 | Fiorini | 280/656 |
| 7,549,661 | B2 * | 6/2009 | Jackson et al. | 280/204 |
| 7,552,933 | B1 * | 6/2009 | Beckman | 280/204 |
| 2003/0102655 | A1 * | 6/2003 | Thompson | 280/656 |
| 2004/0066026 | A1 * | 4/2004 | Schilling | 280/789 |
| 2004/0100045 | A1 * | 5/2004 | Amacker | 280/30 |
| 2005/0040613 | A1 * | 2/2005 | Williams et al. | 280/30 |
| 2005/0093273 | A1 * | 5/2005 | McDonell | 280/656 |
| 2005/0184485 | A1 * | 8/2005 | Timmermans | 280/656 |
| 2006/0279071 | A1 * | 12/2006 | Spainhower | 280/656 |
| 2007/0001431 | A1 * | 1/2007 | Fiorini | 280/656 |
| 2007/0018429 | A1 * | 1/2007 | Randall | 280/491.1 |
| 2007/0182125 | A1 * | 8/2007 | MacDougall | 280/415.1 |
| 2007/0252357 | A1 * | 11/2007 | Hoskins | 280/415.1 |
| 2007/0262562 | A1 * | 11/2007 | Senatore | 280/491.1 |
| 2008/0252044 | A1 * | 10/2008 | Barton | 280/655 |
| 2009/0134605 | A1 * | 5/2009 | Norton | 280/656 |
| 2009/0194968 | A1 * | 8/2009 | Ardagna | 280/460.1 |

FOREIGN PATENT DOCUMENTS

| | | | |
|---|---|---|---|
| JP | 05131959 A | * | 5/1993 |

OTHER PUBLICATIONS

Folding ramp sales literature, www.sportsmansguide.com/cb/cb.asp?a=247717; Jan. 28, 2006.

Photograph, www.countryatv.com/5400b.jpg; Nov. 19, 2005.

Photograph, www.countryatv.com/flatbedatv3.jpg; Nov. 19, 2005.

Photographs, www.pawprint-trailers.com/pawprint/2-place.htm; Jan. 21 2006, 2 pgs.

Sales literature, www.etrailerpart.com/spindles.htm; Jan. 28, 2006, 2 pgs.

Photographs, www.pawprint-trailers.com/pawprint/subframe.htm; Jan. 21, 2006.

Photographs, www.pawprint-trailers.com/pawprint/atv_trailer.htm; Jan. 21, 2006.

Sales literature, www.pawprint-trailers.com/pawprint/index2.htm; Jan. 21, 2006.

Sales literature, www.cyclecountry.com/products/trailers/5thwheel.htm; Jan. 18, 2006.

Photographs, www.pawprint-trailers.com/pawprint/accessories/boom.htm; Jan. 20, 2006.

Sketch, www.pawprint-trailers.com/pawprint/stdfeatures/e-zlube.htm; Jan. 20, 2006.

Photograph, www.pawprint-trailers.com/pawprint/accessories/extension.htm; Jan. 20, 2006.

Product description, www.etrailerpart.com/halftorsionaxles.htm; Jan. 28, 2006.

Product description, www.southwestwheel.com/sidebar/Promo3.htm; Jan. 29, 2006, 2 pgs.

Photograph, www.pawprint-trailers.com/pawprint/stdfeatures/axle.htm; Jan. 20, 2006.

Article, "Flexible Rubber Torsion Axles", 198.173.89.79/flexride.html; Jul. 2, 2006, 2 pgs.

Sales literature, www.cabelas.com/cabelas/en/templates/pod/horizontal-pod.jsp?_DARGS=/cabelas/en/co... Feb. 26, 2006, 2 pgs.

\* cited by examiner

TRAILER HAVING A FOLDING AND LOAD BEARING PLATFORM

CROSS-REFERENCE TO RELATED APPLICATIONS

This application claims the benefit of U.S. Provisional Application No. 60/926,728, filed Apr. 30, 2007, the disclosure of which is incorporated herein by reference.

BACKGROUND OF THE INVENTION

This invention relates in general to a towable cart or trailer having a folding and load bearing platform and in particular, to a rough terrain trailer having a folding platform suitable for storage between use periods.

Towable carts and trailers are known that have folding platforms that can be converted from a generally flat, planar surface to an articulated position for storage or transport. Examples include U.S. Pat. No. 4,786,073 to Harper which discloses a foldable trailer having three, pivotally connected sections. The sections can be moved from a trailering position, having a planar surface, to a storage position, where the end sections are folded perpendicularly relative to the center section. U.S. Pat. No. 6,254,117 to Cross discloses a folding trailer having a multi-plane, articulating hitch construction for use with an all terrain vehicle. The trailer may be stored vertically in a folded position while remaining attached to the all terrain vehicle.

Other examples of folding carts include U.S. Pat. No. 5,673,928 to Jury which describes a portable, hand drawn cart for backpack transport to a hunting site in order to remove a game carcass. While being able to fold into a small package, the load bearing platform requires latches to maintain an unfolded position. U.S. Pat. No. 6,511,092 to Chepa discloses an expandable utility trailer having removable end panels that can be stowed under the center section. The removable panels facilitate a small storage envelope.

It would be desirable to have an improved folding trailer capable of being towed behind a vehicle.

SUMMARY OF THE INVENTION

This invention relates to a folding trailer suitable for being towed behind a vehicle. The folding trailer includes a platform having a center section, a forward section, and a rearward section. A first hinge element engages the center section and the forward section and has a first rotational centerline. The first rotational centerline is above the center section. The first hinge element enables the forward section to be folded relative to the center section. A second hinge element engages the center section and the rearward section and has a second rotational centerline. The second rotational centerline is above the center section. The second hinge element enables the rearward section to be folded relative to the center section. The second rotational centerline further is vertically offset from the first rotational centerline and longitudinally spaced apart from the first rotational centerline so that when the trailer is in a folded position one of the forward and rearward sections is positioned between the center section and the other of the forward and rearward sections.

The folding trailer further includes a tow bar pivotally mounted with respect to the center section. The tow bar includes a pivot assembly having a tongue mounting bracket and a pivot pin. The mounting bracket engages the center section and the pivot pin provides rotation of the tow bar relative to the center section.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
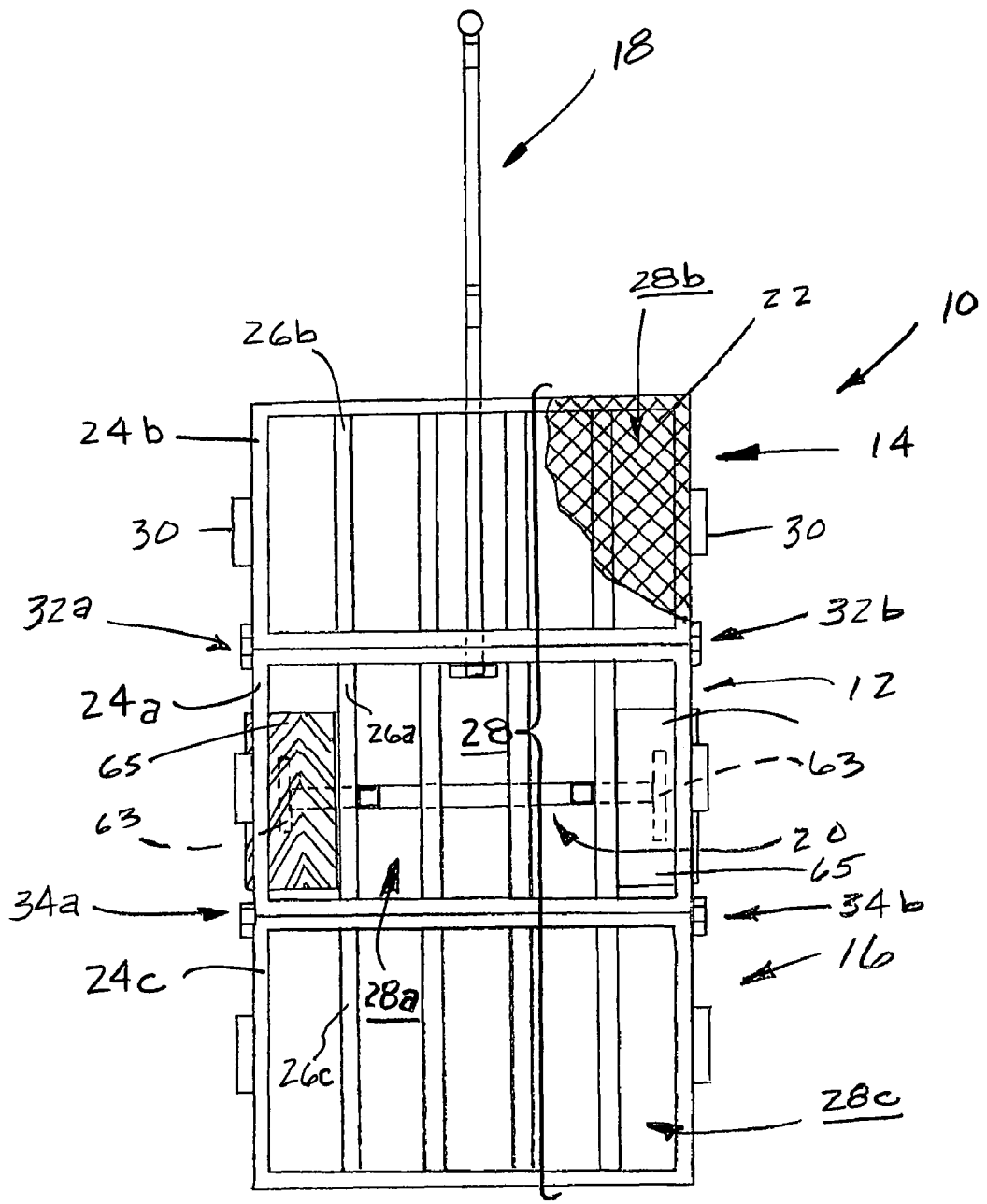
FIG. 1 is a plan view, in partial cross section, of a trailer according to an embodiment of the invention.

Referring now to the drawings, there is illustrated in FIG. 1 a folding trailer, indicated generally at 10, suitable for towing behind a vehicle, such as an all-terrain-vehicle (ATV), for use in rugged conditions. The folding trailer 10 may be quickly and conveniently moved from a storage position to a trailering position during an activity, such as hunting. Further, the folding trailer is capable of supporting a load, such as a game carcass, and has sufficient ground clearance and lateral stability to transport such a load over rugged terrain.

As used herein, directional terms, such as forward, rearward, upper, lower, right, and left, used to describe various components and features of the folding trailer 10 are only intended to indicate relative orientations of such components and features for ease of understanding. Such relative orientations are not to be construed as limiting features of the invention, unless specifically stated. Furthermore, the scope of this invention is not intended to be limited for use with the specific structure of the folding trailer 10 illustrated in FIG. 1. On the contrary, as will become apparent below, this invention may be used in any desired environment for the purposes described below.

The folding trailer 10 includes a center section 12, a forward section 14, and a rearward section 16. The folding trailer 10 further includes a tow bar assembly 18 and an axle assembly 20. The center, forward, and rearward sections 12, 14, and 16, respectively, may each be covered with a decking layer 22. As illustrated in FIG. 1, the decking layer 22 may be a grate, expanded wire screen, or other perforated flooring material. The decking material 22 may also be a solid material, such as sheet metal, plywood, plastic, diamond plate, and the like. Alternatively, the decking layer 22 may be omitted completely, if so desired.

Each of the center, forward, and rearward sections 12, 14, and 16, respectively, includes a section perimeter frame 24a, 24b, and 24c, respectively, and at least one cross member 26a, 26b, and 26c, respectively, secured thereto. Though the cross members 26a, 26b, and 26c are illustrated in a longitudinal orientation, that is, oriented substantially parallel with the tow bar assembly 18, such a relative orientation is not required. Alternatively, the cross members 26a, 26b, and 26c may be oriented laterally, being perpendicular to the tow bar assembly 18, diagonally, or any other suitable load bearing position. The perimeter frames 24a, 24b, and 24c and the associated cross members 26a, 26b, and 26c of each respective section 12, 14, and 16 cooperate to define a substantially flat, upper load platform 28. The platform 28 is defined by cooperating center, forward, and rearward section platforms 28a, 28b, and 28c, respectively, that define a substantially flat, load supporting plane of the center, forward, and rearward sections 12, 14, and 16, respectively. The decking layer 22 may be attached to each of the sections12, 14, and 16 to become the uppermost surface of the platform 28, if so desired. Each section 12, 14, and 16 may also include optional loop brackets 30. The loop brackets 30 may be handles, to facilitate the articulation of the forward and rearward sections 14 and 16, respectively, relative to the center section 12. The loop brackets 30 further provide mounting points for optional side boards (not shown) in order to prevent a load from unintentionally rolling off the platform 28. The loop brackets 30 may also provide tie down points to secure the load to the platform 28, by way of ropes, bungee cords, or the like.

Figure 2:
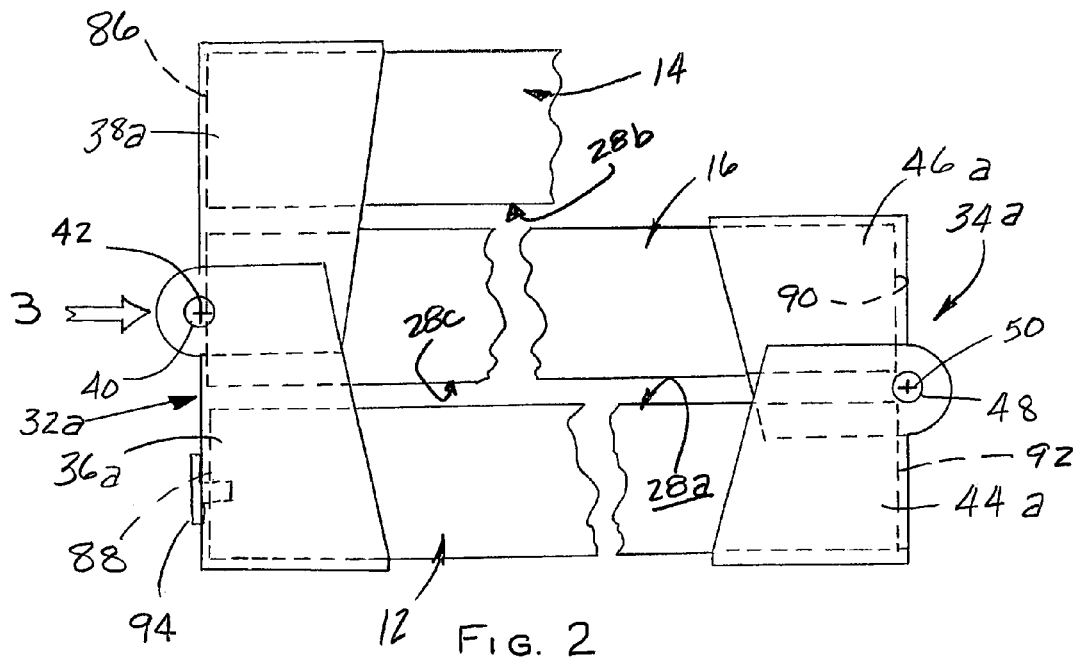
FIG. 2 is an enlarged side view, of a portion of the trailer of FIG. 1 having a hinge arrangement according to an embodiment of the invention.
Figure 3:
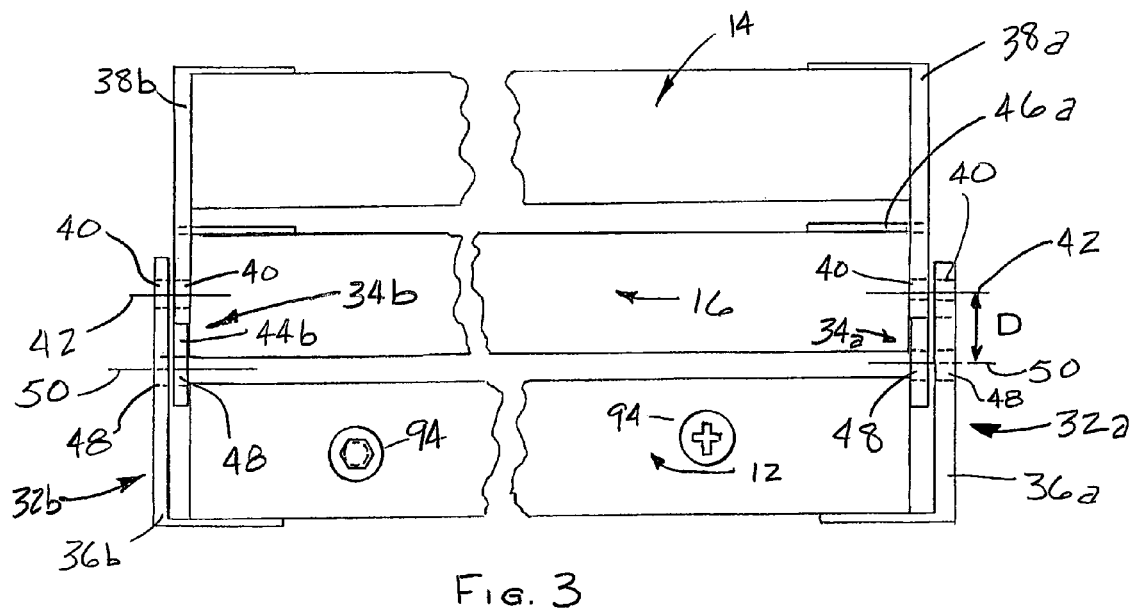
FIG. 3 is an end view of the portion of the trailer of FIG. 2.
Figure 4:
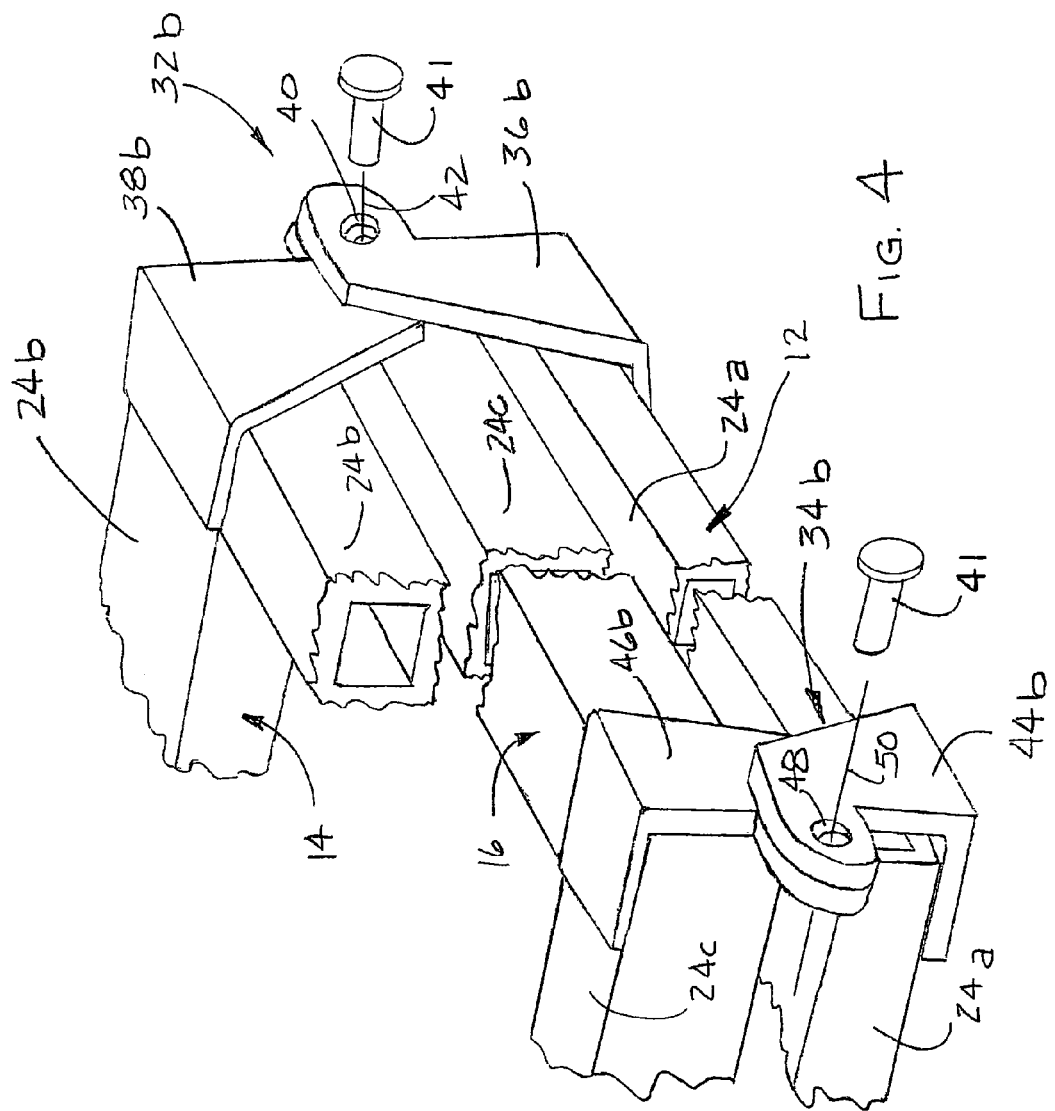
FIG. 4 is a perspective view of the hinge arrangement of the portion of the trailer of FIGS. 3 and 4.

Referring now to FIGS. 2, 3, and 4, the center, forward, and rearward sections 12, 14, and 16, respectively, are connected to adjacent sections by forward hinge elements 32a and 32b and rearward hinge elements 34a and 34b. The forward hinge elements 32a and 32b are illustrated in FIG. 2 as being mounted on opposing sides of the center and forward sections 12 and 14, respectively. Alternatively, the forward hinge elements 32a and 32b may be mounted within the outer edges of the perimeter frames 24a, 24b, and 24c, if so desired. It should be understood also that the positions of the forward and rearward sections 14 and 16 may be reversed relative to the center section 12. Such a reversed orientation allows the sections to be folded in a different order, yet achieve the same compact profile of the trailer 10 when folded.

Specifically, the forward hinge element 32a includes a lower hinge bracket 36a and an upper hinge bracket 38a, each including an aperture 40 formed therethrough. The hinge brackets 36a, 36b, 38a, and 38b may each be mounted to the respective sections by means of welding, bolting, screwing, riveting, adhering with adhesives, or any other suitable structural securing method. Likewise, the forward hinge element 32b includes a lower hinge bracket 36b and an upper hinge bracket 38b, each including an aperture 40 formed therethrough. The apertures 40 of the forward hinge element 32a are aligned and adapted to receive a pivot pin or fastener 41 about which the upper hinge bracket 38a rotates relative to the lower hinge bracket 36a. Likewise, the forward hinge element 32b includes apertures 40 that align to accept a pivot pin or fastener 41 for relative rotation of the lower and upper hinge brackets 36b and 38b, respectively, thereabout. The aligned apertures 40 of the forward hinge elements 32a and 32b further cooperate to establish a first rotational centerline 42.

The rearward hinge elements 34a and 34b are mounted to opposing sides of the center and rearward sections 12 and 16, respectively. Specifically, the rearward hinge element 34a includes a lower hinge bracket 44a and an upper hinge bracket 46a, each including an aperture 48 formed therethrough. Likewise, the rearward hinge element 34b includes a lower hinge bracket 44b and an upper hinge bracket 46b, each including an aperture 48 formed therethrough. The aligned apertures 48 of the rearward hinge elements 34a and 34b cooperate to establish a second rotational centerline 50. The hinge brackets 44a, 44b, 46a, and 46b may each be mounted to the respective sections by means of welding, bolting, screwing, riveting, adhering with adhesives, or any other suitable structural securing method.

Figure 9:
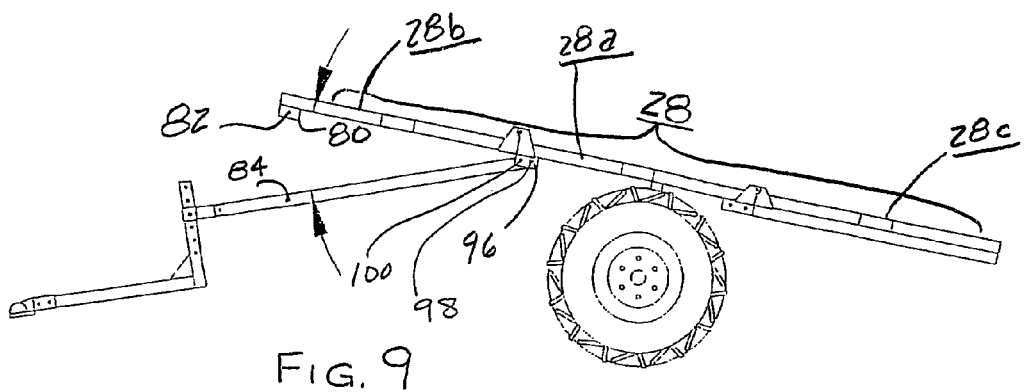
FIG. 9 is a side view of the trailer of FIG. 8 in a tilted position.

As shown in FIG. 3, the first rotational centerline 42 is vertically offset with respect to the second rotational centerline 50 by a distance D, relative to the center section 12. Both the first and second rotational centerlines 42 and 50, respectively, are positioned on the same side of the center section 12, which is opposite of the wheel mounting side. The term "vertically offset" denotes the position of the rotational centerlines 42 and 50 as being above a plane defined by the platform 28a of the center section 12, as shown in the folded position of FIG. 2. Likewise, the rotational centerlines 42 and 50 are also above the plane defined by the entire platform 28, when the trailer 10 is in the deployed or unfolded position as shown in FIGS. 1 and 9. The first rotational centerline 42 is located approximately half way between the center section platform 28a and the forward section platform 28b. In this way, the forward section 14 is also vertically offset from the rearward section 16 relative to the center section 12, when the trailer is in the folded position.

Figure 7:
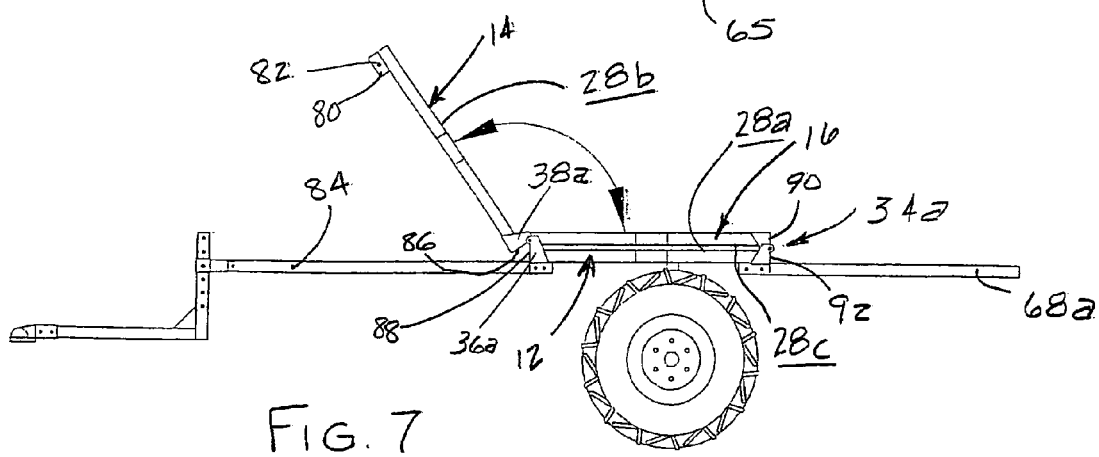
FIG. 7 is a side view of the trailer of FIG. 6 having a forward section unfolding relative to a center section.
Figure 8:
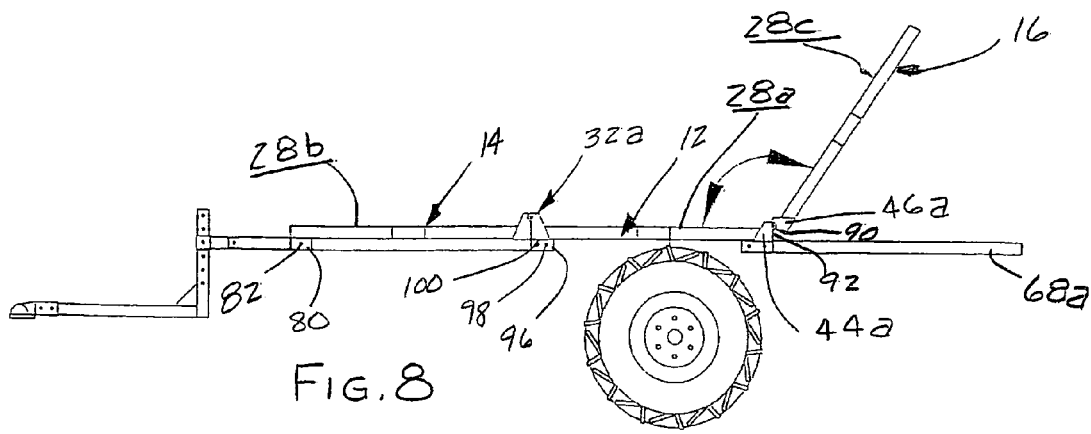
FIG. 8. is a side view of the trailer of FIG. 7 having a rearward section unfolding relative to the center section.

The second rotational centerline 50 is located approximately midway between the section platform 28a of the center section 12 and the top portion or section platform 28c of the rearward section 16, when the sections are folded, as shown in FIG. 2. The first and second rotational centerlines 42 and 50, respectively, are also spaced apart in the horizontal plane of the center section 12. The term "spaced apart", when used in the context of the section hinge assemblies, denotes the longitudinal separation of the rotational centerlines 42 and 50 relative to the center section 12, where longitudinal denotes an orientation generally parallel to the tow bar assembly 18. The center section 12 thus serves as a rotational datum for the hinge elements 32 and 34 and as a mounting base for other structural components, as will be described below. The forward section 14 is able to rotate about the first rotational centerline 42 relative to the center section 12, as shown in FIG. 7. Likewise the rearward section 16 is able to rotate about the second rotational centerline 50 relative to the center section 12, as shown in FIG. 8, as will be described in detail below.

Figure 5:
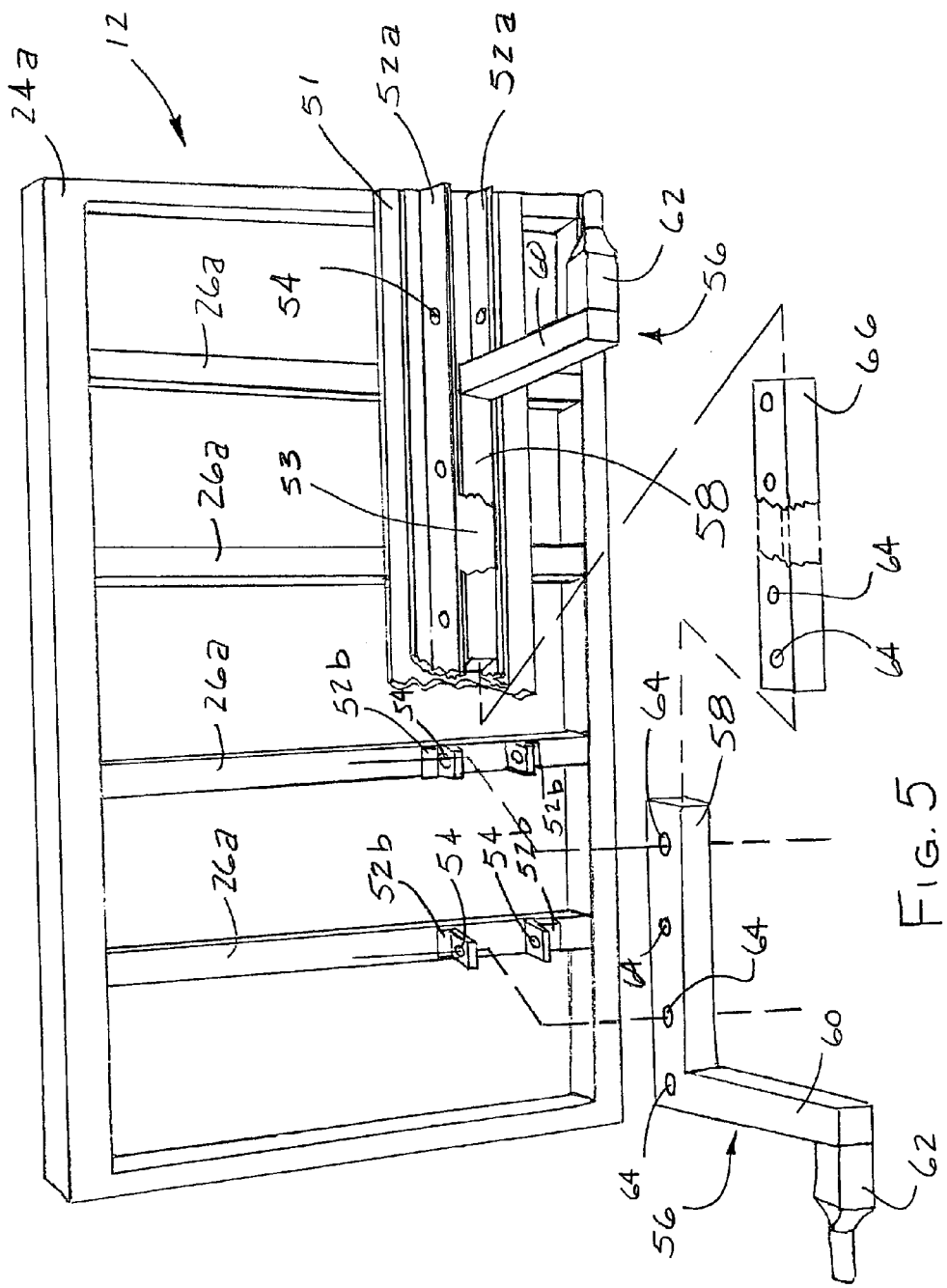
FIG. 5 is a partially exploded view of a center section of a trailer according to an embodiment of the invention.

Referring now to FIG. 5, the underside of the center section 12, which is the side opposite the section platform 28a, includes an axle mounting structure. The axle mounting structure is shown having an optional mounting plate 51, and a pair of opposed axle mounting braces 52a. The mounting plate 51 may be an elongated plate for securing the braces 52a to the center section 12, though such a plate is not required. In one embodiment, the mounting braces 52a are configured as spaced apart "L"-shaped, angle brackets that substantially span the width of the center section 12. In another embodiment, the mounting braces 52a are connected together by a substantially flat web element 53. The web element 53 may be a separate component that is secured to the mounting braces 52a or an integral web that is approximately eighty percent of the length of the braces 52a. In another embodiment, the web element 53 may be one or more of a relatively short length compared to the width of the center section 12. Alternatively, the axle mounting structure may be a plurality of opposed; spaced apart axle mounting tabs 52b attached to the cross members 26a, shown in FIG. 5 as four opposed tabs 52b.

The axle mounting braces 52a each include a plurality of mounting apertures 54 that substantially align with mounting apertures on the opposing braces. Likewise, the axle mounting tabs 52b each include a mounting aperture 54 that is aligned with the mounting aperture 54 of the opposing tab 52b mounted on one of the cross members 26a. The tabs 52, mounted on one of the cross members 26a, are spaced apart a sufficient distance to receive a right or a left side axle portion 56 of the axle assembly 20. The terms right and left are location indicators relative to each side of the tow bar assembly 18. Further, the right and left side axle portions 56 are mirror images and deviate only in their relative mounting positions onto the center section 12. As such, references to features of the axle portions 56 are applicable to either right or left sides, unless so stated.

Each of the axle portions 56 includes a cross bar 58, a down leg 60, and a wheel spindle 62. The cross bar 58 engages the down leg 60 at a substantially right angle, though any obtuse angle may be used if so desired. The wheel spindle 62 extends at a substantially right angle to the down leg 60, though any complimentary obtuse angle may be used that results in a substantially parallel orientation between the wheel spindle 62 and the cross bar 58. The down leg 60 provides increased ground clearance under the trailer 10 in order to aid in traversing rutted, rocky, or severely contoured terrain, such as may be encountered on two-track pathways or other off-road locations. The wheel spindles 62 may include wheel hubs 63 each having support bearings and a flange, shown in FIG. 1, though such is not required. A wheel 65, comprising a rim and a tire, may mount directly onto the wheel spindle 62 or onto the wheel hub 63, if so desired. The cross bar 58 includes a plurality of spaced apart, adjustment apertures 64 that align with corresponding mounting apertures 54 of the tabs 52. The adjustment apertures 64 provide an adjustable distance between the right and left wheel spindles 62, thus allowing a wide or narrow wheel track or spread. The wide wheel spread may be beneficial when carrying heavy loads to prevent tipping or rolling of the trailer. The narrow wheel spread may be beneficial in traversing closely spaced objects, such as, for example, trees or fence posts. The opposing cross bars 58 of the right and left side portions 56 may further be connected together by a tie bar 66, though such is not required.

Figure 6:
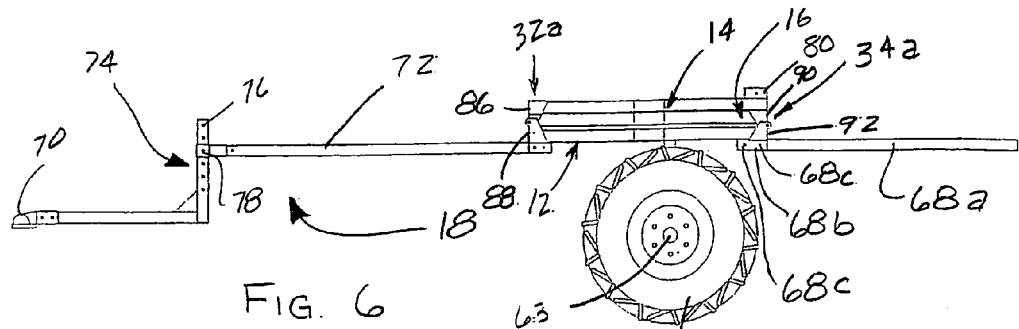
FIG. 6 is a side view of a trailer in a folded position having a removable load support member in accordance with an embodiment of the invention.

Referring now to FIG. 6, the trailer 10 is shown in the folded position. The trailer 10 is shown including a removable load support member 68a, though such a support member is not required. The load support member 68a provides an additional load reaction point when the rearward section 16 is opened to a substantially flat position. The load support member 68a may be used when the trailer 10 is carrying loads that are at or near the trailer weight capacity, especially when the weight is shifted to the rearward section 16. The load support member 68a engages a bracket 68b that is secured to the rearward (section end away from the tow bar assembly 18), underside of the center section 12. The bracket 68b is shown having two mounting apertures 68c that align with corresponding apertures formed into the end of the member 68a. A pair of fasteners (not shown) secures the member 68a to the bracket 68b.

The tow bar assembly 18 includes a coupler 70, a tongue 72, and a tongue height adjuster 74, the purpose and operation of which are conventional and known in the art. The coupler 70 is illustrated as a hitch ball type connection, though any style of coupler may be used. For example, the coupler may be a ring, a "U"-shaped connection, or other pivotable connection suitable for towing a trailer. The tongue height adjuster 74 engages and slides relative to a similarly shaped, vertically oriented, hollow end of the tongue 72 for relative movement therewith. The tongue height adjuster 74 provides a variable adjustment between the coupler and the tongue 72 to accommodate different hitch ball heights of various vehicles. The adjuster 74 includes a plurality of adjustment apertures 76 that may be selectively aligned with a tongue aperture 78 formed in the height adjustment end of the tongue 72.

FIGS. 7, 8, and 9 illustrate the relative movements of each of the sections 12, 14, and 16 to deploy the trailer 10 from the folded position shown in FIG. 6 to the flat position of the platform 28 shown in FIGS. 1 and 9. The relative movements of the sections 12, 14, and 16 will be described using right, left, forward, rearward, upper, lower, and other relative location terms based on the trailer 10 layout of FIGS. 6-9. Referring now to FIG. 7, the forward section 14 is rotated counterclockwise about the first rotational centerline 42 until the underside (side opposite the section platform 28b) of the forward section 14 rests on top of the tongue 72. The forward section 14 may include a tongue locking bracket 80 having a first locking aperture 82 formed therethrough. The locking bracket 80 may be a "U"-shaped bracket that locates on opposing sides and top surface of the tongue 72. The "U"-shaped bracket has a pair of aligned first locking apertures 82 formed on both extending legs. Alternatively, the locking bracket 80 may be "L"-shaped or flat with a single, first locking aperture 82 formed therethrough. A second locking aperture 84 is formed through both of the opposing sides of the tongue 72. As the forward section 14 is lowered onto the tongue 72, the first and second locking apertures 82 and 84, respectively, are aligned such that a fastener, pin, or clasp (not shown) may be inserted to secure the forward section 14 onto the tongue 72. The perimeter frame 24b of the forward section 14 includes a forward load face 86 that rests against a front center load face 88 of the center section 12. The load faces 86 and 88 cooperate to help prevent further counterclockwise rotational motion of the forward section 14 about the first rotational centerline 42 after deployment into the load carrying position. Either of the load faces 86 and 88, or both, may include stop pads 94 that are optionally threaded and adjustable to proportion load transfer between the sections and adjust the generally flat, relative orientation of the section platforms 28a, 28b, and 28c, that form the platform 28.

Referring now to FIG. 8, the rearward section 16 is rotated clockwise about the second rotational centerline 50 until contact is made with the load support member 68a. Similar to the forward section 14 described above, the perimeter frame 24c of the rearward section 16 includes a rearward load face 90 that rests against a rear center load face 92 of the center section 12. These load faces 90 and 92 cooperate to prevent further rotational motion of the rearward section 16. Likewise, the load faces 90 and 92 may also include the stop pads 94 to proportion load transfer between the sections and adjust the relative flat orientation of the platform 28.

When the trailer 10 does not include the removable load support member 68a, the cooperating load faces 90 and 92, along with the hinge elements 34a and 34b, bear the reaction forces created by the weight of the rearward section 16 and anything supported thereon. Without the load support member 68a attached, as the trailer 10 is towed along rough terrain, the rearward section 16 is free to rotate counterclockwise about the second rotational centerline 50 if a portion of it contacts the ground. Such a condition may arise, for example, when traversing a narrow and deep creek bed or trench where the rearward section 16 may trail on one bank while the ATV is rising up the other opposing bank. This condition will help prevent the trailer 10 from getting stuck between narrow creek bank walls by preventing the rearward section from removing vehicle weight from the wheels 65.

In order to provide greater load capacity and rotational freedom of the rearward section 16, the load support member 68a may be alternatively mounted to the support bracket 68b by a pivot pin or fastener, similar to pivot pin 41, engaging the rearward-most mounting aperture 68c. This arrangement allows the support member 68a to freely rotate counterclockwise about the fastener in the rearward most aperture 68c. Further, a portion of the support member 68a may react against a portion of the center section 12 to prevent further clockwise rotation from the substantially flat orientation of the platform 28.

Referring now to FIG. 9, the tongue 72 may be pivotally mounted to the center section 12 to facilitate removal of objects thereon. Alternatively, the tongue 72 may be fixed to the center section 12 so that no relative rotation therewith can occur. The tongue 72 is mounted to the center section 12 by way of a tongue mounting bracket 96. The tongue mounting bracket 96 is secured to the underside (side opposite the section platform 28a) of the center section 12 by any suitable means, such as welding, bolting, screwing, riveting, adhering with adhesives, and the like. The tongue mounting bracket 96 may be a "U"-shaped bracket having downwardly extending legs that include a pair of aligned pivot apertures 98 formed therethrough. The aligned pivot apertures 98 cooperate with mating apertures formed through the tongue 72 to receive a fastener, pin, or other structure (not shown) to provide rotation thereabout. The tongue mounting bracket 96 also includes a pair of aligned locking apertures 100 that can engage a pin or fastener (not shown) in order to prevent pivoting movement of the platform 28 until desired. Alternatively, the tongue 72 may be permanently secured to the mounting bracket 96 by welding, adhesive bonding, riveting, and the like.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A folding trailer suitable for being towed behind a vehicle comprising:
    a platform having a center section, a forward section, and a rearward section, each section having a surface configured to support a load thereon and each section having a load face between adjacent sections such that a load applied onto one of the load support surface of the forward or rearward sections is transferred to the center section;
    a first hinge element engaging the center section and the forward section and having a first rotational centerline, the first rotational centerline being above the center section, the first hinge element enabling the forward section to be folded relative to the center section;
    a second hinge element engaging the center section and the rearward section and having a second rotational centerline, the second rotational centerline being above the center section, the second hinge element enabling the rearward section to be folded relative to the center section, the second rotational centerline further being vertically offset from the first rotational centerline and longitudinally spaced apart from the first rotational centerline so that when the trailer is in a folded position one of the forward and rearward sections is positioned between the center section and the other of the forward and rearward sections; and
    at least one stop pad engaged to at least one of the load faces of the adjacent sections and disposed between two adjacent sections, the at least one stop pad being adjustable to vary the relative orientation of the adjacent sections.

2. The folding trailer of claim 1 wherein the first rotational centerline is oriented substantially half of the distance between a center section platform and a forward section platform when the trailer is in the folded position.

3. The folding trailer of claim 2 wherein the second rotational centerline is oriented substantially between the center section platform and a rearward section platform when the trailer is in the folded position.

4. The folding trailer of claim 1 wherein the first rotational centerline and the second rotational centerline are longitudinally spaced apart from the center section.

5. The folding trailer of claim 1 wherein the center section includes a plurality of axle mounting tabs engaging a portion of the center section, the axle mounting tabs each having a mounting aperture formed therethrough.

6. The folding trailer of claim 5 wherein a pair of opposed axle portions each having a cross bar, a down leg, and a wheel spindle, the cross bars each having a plurality of adjustment apertures being configured for selective alignment with at least one of the axle mounting apertures to define an adjustable wheel track width.

7. The folding trailer of claim 6 wherein the axle mounting tabs are pairs of opposing axle mounting tabs and the mounting apertures of the opposing tabs are substantially aligned.

8. The folding trailer of claim 7 wherein the pairs of opposing axle mounting tabs engage the sides of the cross bar of the opposed axle portions.

9. The folding trailer of claim 5 wherein the axle cross bar is substantially parallel with the wheel spindle, the down leg being substantially perpendicular to the cross bar.

10. The folding trailer of claim 5 wherein the axle cross bar is substantially parallel with the wheel spindle, the down leg engaging the cross bar at an oblique angle.

11. The folding trailer of claim 1 wherein a tow bar is pivotally mounted with respect to the center section, the tow bar including a pivot assembly having a tongue mounting bracket and a pivot pin, the mounting bracket engaging the center section, the pivot pin providing rotation of the tow bar relative to the center section.

12. The folding trailer of claim 11 wherein one of the forward section and the rearward section includes a tongue locking bracket having a first locking aperture, the tow bar having a second locking aperture, the locking bracket engaging the tow bar such that the first and second locking apertures are substantially aligned.

13. The folding trailer of claim 11 wherein the rearward section is supported by a removable load support member.

* * * * *